United States Patent [19]

Cheiky

[11] Patent Number: 4,913,983

[45] Date of Patent: Apr. 3, 1990

[54] METAL-AIR BATTERY POWER SUPPLY

[75] Inventor: Michael C. Cheiky, Santa Barbara, Calif.

[73] Assignee: Dreisbach Electromotive, Inc., Santa Barbara, Calif.

[21] Appl. No.: 243,912

[22] Filed: Sep. 13, 1988

[51] Int. Cl.$^4$ .............................................. H01M 8/04
[52] U.S. Cl. ........................................ 429/13; 429/22; 429/27
[58] Field of Search ................. 429/12, 22, 23, 27, 429/34, 52, 61, 110, 13

[56] References Cited

U.S. PATENT DOCUMENTS

| 2,468,430 | 4/1949 | Derksen | 429/27 |
| 3,160,528 | 12/1964 | Dengler et al. | 429/22 |
| 3,473,963 | 10/1969 | Sanderson | 429/23 |
| 4,729,930 | 3/1988 | Beal et al. | 429/23 |

Primary Examiner—Donald L. Walton
Attorney, Agent, or Firm—Marvin E. Jacobs

[57] ABSTRACT

A metal-air battery power supply for powering a device includes an enclosed container having an air inlet, an air outlet, and an array of connected metal-air battery cells therein. The container is sealed during non-use. When a power switch is turned on, the air inlet and air outlet are opened. At the same time, the residual low power of the battery cells is used to start a fan positioned near the air inlet. The fan initiates an air flow across the battery cells to further increase the power supply output. The power supply output is limited to the use requirement of the device by varying the fan speed in response to instructions from the device. Precise control of the battery cells' exposure to air extends the lifetimes of the cells.

15 Claims, 1 Drawing Sheet

METAL-AIR BATTERY POWER SUPPLY

BACKGROUND OF THE INVENTION

1. Field of the Invention

This invention relates to battery power supplies, and more particularly to power supplies using metal-air batteries.

2. Description of the Prior Art

The use of metal-air batteries is becoming increasingly prevalent for powering electronic and other devices due to the high energy densities of the batteries. Metal-air batteries require oxygen from a continuous flow of air across the air cathode for optimal battery operation.

Metal-air batteries are typically limited to small sizes and low power outputs because of their sensitivity to humidity in the air. A metal-air battery will fail unless its exposure to water vapor (humidity) in the air is tightly controlled. The equilibrium vapor pressure for the batteries results in an equilibrium relative humidity of about 40%. If the ambient humidity is greater than this equilibrium value, the battery's electrolyte will absorb water from the air through the air cathode and fail due to a condition called flooding. This flooding may cause the battery to leak or to burst.

If the ambient humidity is less than the equilibrium value, water will leave the electrolyte and evaporate through the air cathode. This drying out condition will also cause the battery to fail.

Another problem with a metal-air battery is that oxygen in the air has a tendency to corrode the metal anode by causing the anode to oxidize when the battery is not in use. Also, the presence of air when the battery is not in use causes the battery to self-discharge, resulting in decreased battery output and lifetime.

The battery output is also decreased by the presence of contaminants in the air, including carbon dioxide, cigarette and other smoke, and sulfides. For example, carbon dioxide reacts with the metal hydroxide formed by the reaction between the anode and the electrolyte. The reaction between carbon dioxide and the metal hydroxide forms a metal carbonate compound that interferes with optimal electrolytic action.

Sealing the battery container to keep air from entering it when the battery is not in use will prolong the battery's lifetime. The sealed battery and the air remaining in it will reach the equilibrium humidity of about 40%. The battery will not corrode during non-use, and contaminants cannot be introduced.

However, sealing of the battery causes another problem. A sealed metal-air battery will self-discharge until virtually all of the air trapped in the battery is used up. Without this air, the battery will have only a small initial output power upon startup until an air flow is introduced in the battery. This initial low-power battery output is insufficient to start up most equipment, resulting in a failure of the power supply.

SUMMARY OF THE INVENTION

It is a feature and advantage of the present invention to provide a metal-air battery power supply that is capable of starting up equipment even though the supply's initial power output is very low.

It is another feature and advantage of the present invention to control the air flow during battery discharge in a metal-air battery power supply to extend the life of the power supply.

It is yet another feature and advantage of the present invention to control the exposure of a metal-air battery power supply to air when the power supply is not in use to extend the battery's life and to prevent failure of the power supply.

These and other features and advantages are achieved in a metal-air battery power supply comprised of an array of interconnected metal-air battery cells placed in an airtight container. The airtight container is sealed when the power supply is not in use. The container is opened to permit an air flow across the metal-air battery cells in the container when the supply is in use by means of a baffle connected to a power switch, or alternatively by a power switch that controls a solenoid or motor driven valves to move the baffle. A variable speed fan is positioned near the air inlet.

When the power supply is initially turned on, its output is very low because the oxygen supply in the air trapped within the airtight container has been largely depleted. Some residual low power is available due to secondary reactions within the container or additive oxidizers in the air cathodes of the battery cells. This low power is first used to operate the fan. The fan initiates an air flow across the battery cells, raising the power level of the power supply. This increased power is sufficient to operate the Central Processing Unit (CPU) and Random Access Memory (RAM) of the equipment powered by the power supply. As the CPU is powered up, it reads its Basic Input and Output Instructions (BIOS) stored in a Read Only Memory (ROM) as well as certain parameters stored in nonvolatile RAM memory. These instructions include management software for controlling the output of the power supply. The CPU uses information from its operating system and stored user configuration options to control the fan speed and the corresponding air supply across the metal-air battery cells. The fan speed and the corresponding air flow across the metal-air battery cells limit the output power of the battery power supply to match the use requirement for the particular equipment operation taking place.

The computer control of the air supply minimizes the unnecessary air flow across the battery cells, and thus minimizes the loss or gain of water from the electrolytes in the battery cells due to the humidity in the air. This computer control also protects the battery cells from excessive exposure to carbon dioxide and atmospheric pollutants such as cigarette smoke and sulfides, thereby greatly extending the life of the battery cells.

When the power supply is turned off, the airtight container of the power supply is sealed by moving the air baffle in front of the air inlet and the air outlet. Once the internal oxygen remaining in the trapped airtight container is exhausted, the power supply's internal corrosion and selfdischarge are greatly reduced.

These another features and advantages of the invention will be apparent to those skilled in the art from the following detailed description of a preferred embodiment, taken together with the accompanying drawing, in which:

DETAILED DESCRIPTION OF PREFERRED EMBODIMENTS

Figure 1:
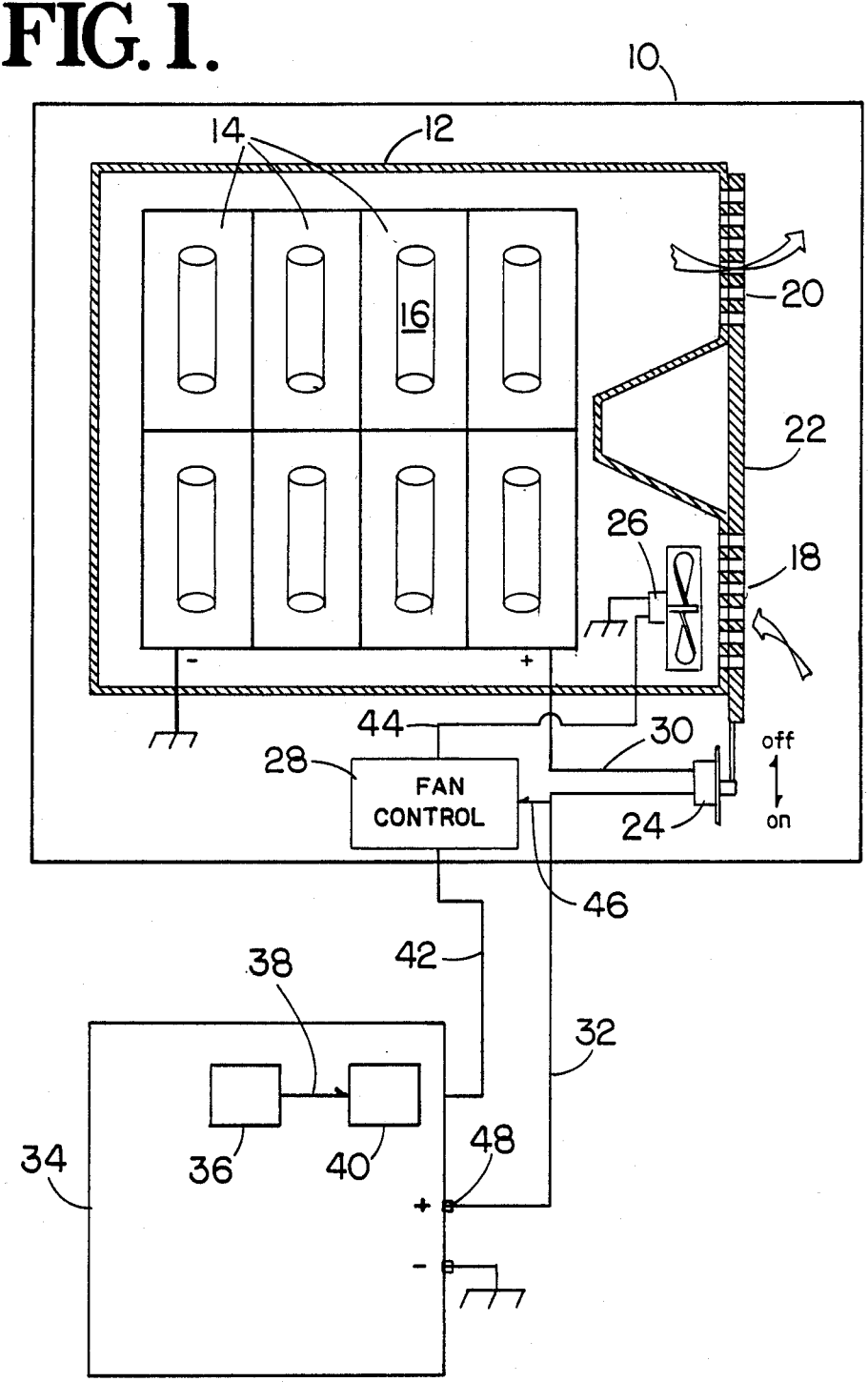
FIG. 1 is a circuit diagram of a preferred embodiment of the metal-air battery power supply according to the present invention.

In FIG. 1, a metal-air battery power supply 10 is used to power a portable personal computer 34. Power supply 10 is comprised of an airtight chamber 12, a power switch 24, and various power and control lines discussed below.

Inside of chamber 12 is an array of interconnected metal-air battery cells 14, each of which has an air duct 16 thereon for allowing an air flow across cell 14. An air baffle 22 is connected to switch 24 and is moveable in front of air inlet 18 and air outlet 20 to seal off container 12 when power supply 10 is not in use. Switch 24 moves air baffle 22 by means of a mechanical connection, or by using a solenoid or motor driven valve. Fan 26 is positioned in front of air inlet 18 to draw in air through inlet 18 that then flows through air ducts 16 in battery cells 14.

Power supply 10 provides power to computer 34 at computer input 48 via power line 32. Computer 34 is also connected to power supply 10 via control line 42.

The operation of the metal-air battery power supply depicted in FIG. I will now be discussed. When power switch 24 is turned on, air baffle 22 is moved to permit an air flow into air inlet 18 that is exhausted through air outlet 20. At the same time, the residual low power from battery cells 14 is output to power switch 24 via power line 30, and then through power line 32 and power line 46 to fan controller 28. This low power is sufficient to cause fan controller 28 to start variable speed fan 26 at a low speed. The starting of fan 26 begins an air flow through air ducts 16 in the array of battery cells 14 to increase the electrical power output by battery cells 14. This increased output power is output from the cell array via power line 30, through power switch 24, through power line 32 and to computer input 48. This increased power is now sufficient to cause a Read Only Memory (ROM) 36 in computer 34 to transmit its Basic Input and Output System (BIOS) control signals via input/output bus 38 to computer output port 40. Output port 40 transmits the control signals via control line 42 to fan controller 28. These control signals instruct fan controller 28 the speed at which fan 26 is to run for any given moment, depending upon the use requirements of computer 34.

Different computer operations in computer 34 require different amounts of power. Assuming that computer 34 is a personal computer, computer 34 has rotating memory storage devices such as floppy disks and hard disks. A computer having a rotation memory device may require at least four distinct operating power levels:

1. A low power level to run the Central Processing Unit (CPU), Read Only Memory (ROM), and Random Access Memory (RAM). The residual low power of power supply 10 is sufficient to run the CPU and at least those ROM and RAM memory circuits that store fan control instructions.

2. A normal power level when the floppy or hard disk is rotating while attempting to access the correct information from the disk.

3. A high power level during those periods when information is being either read from the disk or written to the disk.

4. A very high power level required to begin the rotation of the disk from a resting position.

The present invention adjusts the power output of power supply 10 to match the power requirement by each of the four above-listed power levels. The greater the power requirement for the particular operation occurring at the time, the greater the fan speed of fan 24 as determined by fan controller 28. As the fan speed increases, the air flow across battery cells 14 increases, as does the output power of power supply 10.

By limiting the air flow across cells 14 to only that which is required to provide the power required by computer 34, the exposure of cells 14 to water vapor and contaminants in the air is minimized. This control of the air flow extends the lifetime of the cells 14 and also maintains their output energy densities at optimal levels.

When the use requirement for computer 34 drops to zero, power supply 10 is shut off via switch 24. The movement of switch 24 to the off position causes air baffle 22 to seal off air inlet 18 and air outlet 20. The sealing of the air inlet and air outlet makes container 12 airtight. Once container 12 is sealed, cells 14 will self-discharge until the trapped oxygen within container 12 is used up. At that point the self-discharge ends, thereby extending the life of the battery cells. Also, the water vapor trapped in sealed container 12 reaches an equilibrium state of approximately 40% relative humidity with the water in the electrolytes of cells 14. The achieving of this equilibrium state also greatly extends the life of the battery cells 14 by preventing them from either absorbing too much water and flooding or from giving up water and drying out. The exposure of battery cells 14 to other contaminants in the air is also minimized when container 12 is sealed during non-use, further increasing both the energy densities and lifetimes of battery cells 14.

While a particular embodiment of the invention has been shown and described, numerous modifications and alternate embodiments will occur to those skilled in the art. Although the preferred embodiment has been described in connection with the operation of a portable personal computer, the invention may be used to power any piece of equipment having a processing unit and fan control instructions stored on a low power memory device such as a ROM or non-volatile RAM chip. Accordingly, it is intended the invention be limited only by the following claims.

What is claimed is:

1. A metal-air battery power supply for powering a device, comprising:
    an enclosed power supply container, including:
        an air inlet for allowing air to flow into the power supply container;
        an air outlet for allowing air to flow out of the power supply container;
    baffle means for alternately opening and closing the air inlet and the air outlet;
    at least one metal-air battery cell located inside the power supply container for generating electrical power, said battery having a low level of residual power when said outlet is closed and the container is depleted of oxygen;
    a switch means for controlling the operation of the baffle means;
    a fan located near the air inlet that causes air to flow into the power supply container when the air inlet is open and the fan is running said fan being capable of start-up at the low, residual power level of said cell;

fan starting means, in circuit connection with the fan and the switch means, for starting the operation of the fan solely by means of the low residual power in said cell in response to said switch means; and a first output means, in circuit connection with said battery cell, for outputting electrical power generated by the battery cell.

2. The metal-air battery power supply of claim 1, further comprising:

determining means for determining the power required by said device and outputting a control signal corresponding to the power required; and control means, in circuit connection with said fan, for controlling said fan in response to said control signal.

3. The metal-air battery power supply of claim 1, further comprising:

storage means in said device for storing fan control instructions; and a second output means, in circuit connection with said fan control means, for outputting said fan control instructions to said fan control means.

4. The metal-air battery power supply of claim 3, wherein said stored fan control instructions include:

low power instructions that direct said fan control means to operate said fan at a low speed when relatively low power is required by the device;

normal power instructions that direct said fan control means to operate said fan at a medium speed when the device requires a normal amount of power; and high power instructions that direct said fan control means to operate said fan at a high speed when the device requires a relatively high amount of power.

5. A method of supplying electrical power to a device, comprising:

turning on a power switch;

opening an air inlet and an air outlet in an enclosed sealed, oxygen depleted power supply container in response to the turning on of the power switch, the container having at least one metal-air battery cell having a low level of residual power therein;

starting a fan positioned near the air inlet in response to the turning on of said switch using only the residual low power output by the battery cell, said fan creating an air flow into said container to increase the power output by the battery cell; and outputting the increased power output by the battery cell to the device to power the device.

6. The method of claim 5, further comprising:

determining the power required by the device; and controlling the speed of the fan to vary the power output by the battery cell so that the power output by the battery cell is substantially equal to the determined power required by the device.

7. The method of claims 5 or 6, further comprising:

closing the air inlet and the air outlet when the power supply is not in use.

8. A metal-air batter power supply according to claim 1 in which the metal-air battery cell includes a metal anode, an aqueous electrolyte and an air cathode.

9. A metal-air battery power supply according to claim 8 in which the metal-air cathode contains additive oxidizer in an amount sufficient to provide residual power to start operation of said form.

10. A metal-air battery power supply according to claim 8 in which the electrolyte contains a metal hydroxide.

11. A metal-air battery power supply according to claim 8 in which a plurality of metal-air battery cells are interconnected into an array.

12. A metal-air battery power supply according to claim 11 in which each cell contains an air duct.

13. A method according to claim 5 in which the metal-air battery cell includes a metal anode, an aqueous electrolyte and an air cathode.

14. A method according to claim 13 in which the metal-air cathode contains additive oxidizer in an amount sufficient to provide residual power to start operation of said form.

15. A method according to claim 13 in which the electrolyte contains a metal hydroxide.

* * * * *